W. C. REYNOLDS.
ATTACHMENT FOR PLANTERS.
APPLICATION FILED MAR. 23, 1909.
941,951.
Patented Nov. 30, 1909.
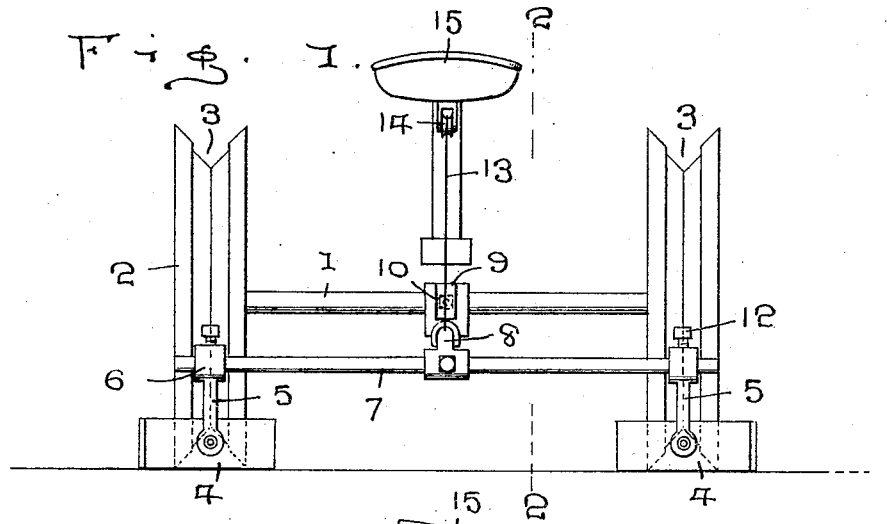
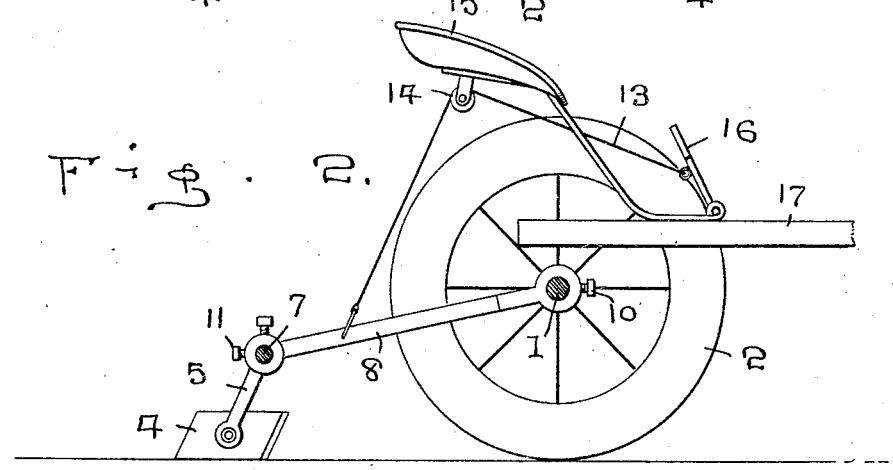
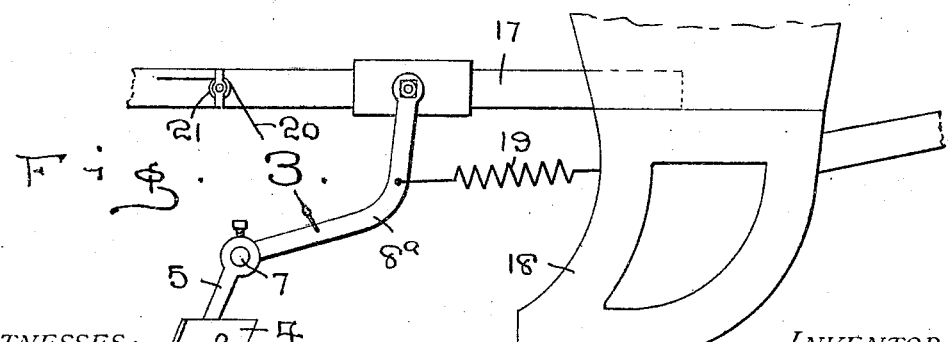
WITNESSES:
INVENTOR
W. C. Reynolds
BY
W. J. FitzGerald & Co.
Attorneys

UNITED STATES PATENT OFFICE.

WALTER C. REYNOLDS, OF POLO, ILLINOIS.

ATTACHMENT FOR PLANTERS.

941,951. Specification of Letters Patent. Patented Nov. 30, 1909.

Application filed March 23, 1909. Serial No. 485,302.

*To all whom it may concern:*

Be it known that I, WALTER C. REYNOLDS, a citizen of the United States, residing at Polo, in the county of Ogle and State of Illinois, have invented certain new and useful Improvements in Attachments for Planters; and I do hereby declare the following to be a full, clear, and exact description of the invention, such as will enable others skilled in the art to which it appertains to make and use the same.

My invention relates to new and useful improvements in attachments for planters and more particularly to corn planters and my object is to provide means for filling the furrows made by the planter wheels and thoroughly cover the corn, as well as to prevent washing away of the soil.

A further object is to provide means for readily attaching the attachment to the planter.

A further object is to provide means for adjusting the angle of parts of the attachment and a further object is to provide means for raising and lowering the attachment as desired.

Other objects and advantages will be hereinafter referred to and more particularly pointed out in the claims.

In the accompanying drawings forming part of this application, Figure 1 is a rear elevation of parts of a planter showing my improved attachment applied in position thereon. Fig. 2 is a sectional view as seen on line 2—2, Fig. 1. Fig. 3 is a side elevation of a slightly modified form of device.

Referring to the drawings in which similar reference numerals designate corresponding parts throughout the several views, 1 indicates an axle, such as is commonly employed by wheel-supported planters and 2 indicates wheels which are provided with circumferential grooves 3, which grooves are adapted to cover the corn after the same has been deposited in a furrow. It has been found by experience, however, that the wheels do not always cover the grain in the furrows and further that the furrows are not completely filled by the wheels, thereby leaving depressions in the soil which will result in collecting water when a severe rain falls, the flow of which through the depressions will wash the soil and remove or uncover grain and to this end, therefore, I provide my improved attachment, which consists of a pair of blades 4, one for each wheel of the cultivator, which blades are secured to shanks 5, the upper ends of the shanks having sockets 6, through which extends a rod 7.

Surrounding the central portion of the rod 7 is a bar 8, the opposite end of said bar being bifurcated and adapted to surround the axle 1, the bar being held against longitudinal movement of the axle by placing a collar 9 between the bifurcated ends of the bar 8 and binding the same in position by means of a binding screw 10, the rod 7 being held in fixed engagement with the bar 8 by means of a binding screw 11 and the shanks 5 are adjustably attached to the rod 7 by means of adjusting screws 12.

The rod 8 being pivotally mounted on the axle 1, may be raised or lowered, as occasion may require, by attaching to the bar 8 adjacent its connection with the rod 7, a cable 13, which cable passes over a sheave 14, carried beneath the seat 15 of the planter and extends into engagement with the foot lever of the planter (not shown) or to a lever 16 pivotally mounted at a suitable point on the frame 17 of the planter and when it is desired to raise the blade from engagement with the soil, the lever 16 is given a forward movement, which may be accomplished by placing the foot thereon and the blades may be held in their elevated position so long as forward pressure is directed against the lever. In this manner, the blades may be readily disengaged from the earth's surface when the planter is to be moved forwardly, or when turning the planter at the ends of the field, obviating any possibility of breaking the blades or shanks carrying the same and by attaching the shanks to the rod 7, through the medium of screws 12, it will be readily seen that the shanks may be disposed at various angles and as the blades are likewise disposed at an angle, the furrows left by the wheels will be filled with the soil as the planter moves forwardly.

In cases where the planter is not provided with axles, a slightly modified construction is used, the bar 8ᵃ employed for supporting the shanks 5, being pivotally attached to parts of the frame 17 and in the rear of the usual form of runners or furrow openers 18 employed for distributing the grain, the blades 4 being held in engagement with the soil through the medium of a spring 19, one end of which is secured to a runner and the opposite end thereof to the bar 8ª and for convenience of raising the bar from engagement with the earth's surface, a cable 20 may be attached to the bar and extended over a sheave 21, attached to parts of the frame 17, said cable being extended into convenient reach of the attendant on the planter.

It will thus be seen that I have provided a very cheap and economical form of covering attachment and one that can be attached to any class of planters and it will likewise be seen that the blades of the attachment may be adjusted at various angles as occasion may require and further that the blades may be readily raised from engagement with the earth's surface when the planter is not in use or when being moved rearwardly or turning at the ends of the field.

What I claim is:

1. A device of the character described comprising a pivoted bar, a transverse rod centrally connected to one end of said pivoted bar, shanks sleeved and held upon said rod near its ends, and covering means attached to the lower ends of said shanks.

2. A device of the character described, comprising a pivoted bar, means for effecting the adjustment of said bar, a rod centrally connected to said bar at one end, covering means, shank members connected to said covering means at their lower ends, and having sleeve-connection with said rod near its ends, said sleeve-connection being provided with adjusting means engaging said rod.

3. A device of the character described, comprising a bifurcated pivoted bar, means for effecting adjustment of said pivoted bar, a rod received by a sleeve at one end of said bar, about at its center, covering means, shanks connected to said covering means at their lower ends, said shanks having sleeves at their upper ends, said sleeves being provided with adjusting means adapted to engage said rod.

4. A device of the character described, comprising a bifurcated pivoted bar, means for the retention of said bifurcated bar in effective position, means for the vertical adjustment of said bar, a rod having sleeve and adjusting screw connection about centrally with said bar, covering means, shanks connected to said covering means at their lower ends, said shanks having sleeve and adjusting means of connection with said rod, and resilient means for aiding the retention of said bar in operative position.

In testimony whereof I have signed my name to this specification in the presence of two subscribing witnesses.

WALTER C. REYNOLDS.

Witnesses:
 IRA STOVER,
 BERT HOLLAND.